United States Patent
Gallant

(10) Patent No.: US 7,242,680 B2
(45) Date of Patent: Jul. 10, 2007

(54) SELECTIVE FEATURE BLOCKING IN A COMMUNICATIONS NETWORK

(75) Inventor: John Kenneth Gallant, Plano, TX (US)

(73) Assignee: Verizon Business Global LLC, Basking Ridge, NJ (US)

( * ) Notice: Subject to any disclaimer, the term of this patent is extended or adjusted under 35 U.S.C. 154(b) by 1037 days.

(21) Appl. No.: 10/097,592

(22) Filed: Mar. 15, 2002

(65) Prior Publication Data

US 2002/0167946 A1    Nov. 14, 2002

Related U.S. Application Data

(60) Provisional application No. 60/276,923, filed on Mar. 20, 2001, provisional application No. 60/276,953, filed on Mar. 20, 2001, provisional application No. 60/276,955, filed on Mar. 20, 2001, provisional application No. 60/276,954, filed on Mar. 20, 2001.

(51) Int. Cl.
*H04L 12/66* (2006.01)

(52) U.S. Cl. ...................................... 370/352; 370/389

(58) Field of Classification Search ..................... None
See application file for complete search history.

(56) References Cited

U.S. PATENT DOCUMENTS

| | | | |
|---|---|---|---|
| 6,161,008 A * | 12/2000 | Lee et al. ................... | 455/415 |
| 6,219,790 B1 | 4/2001 | Lloyd et al. | |
| 6,301,609 B1 | 10/2001 | Aravamudan et al. | |
| 6,311,275 B1 | 10/2001 | Jin et al. | |
| 6,625,141 B1 * | 9/2003 | Glitho et al. ................ | 370/352 |
| 6,636,596 B1 * | 10/2003 | Gallant et al. .......... | 379/220.01 |
| 6,865,681 B2 * | 3/2005 | Nuutinen ...................... | 726/14 |
| 2002/0110113 A1 * | 8/2002 | Wengrovitz ................. | 370/352 |
| 2002/0122547 A1 * | 9/2002 | Hinchey et al. ........ | 379/221.01 |
| 2002/0141404 A1 * | 10/2002 | Wengrovitz .................. | 370/389 |
| 2003/0058838 A1 * | 3/2003 | Wengrovitz .................. | 370/352 |

OTHER PUBLICATIONS

Schulzrinne et al., "SIP Call Control Services", Internet Engineering Task Force, Internet Draft, Jun. 17, 1999.
Schulzrinne et al., "RTP: A Transport Protocol for Real-Time Applications", Internet Engineering Task Force, Request for Comments 1889, Jan. 1996.
Handley et al., "SIP: Session Initiation Protocol", Internet Engineering Task Force, Request for Comment 2543, Mar. 1999.

* cited by examiner

*Primary Examiner*—Bob A. Phunkulh

(57) ABSTRACT

In the context of a communications system, means are disclosed for ensuring that invocation of redirect features, such as call forwarding, do not circumvent call blocking settings. User profile information associated with a party controls the invocation of features for the party and controls the screening of redirect contacts resulting from feature invocation. The behavior of feature-associated contact screening for the party is configurable independently of the originating calling permissions of the party.

16 Claims, 9 Drawing Sheets

'A' BLOCKED FROM CALLING 'C'

CALL FORWARDING AT 'B'
BYPASSES DESIRED BLOCKING

SELECTIVE FEATURE BLOCKING IN A COMMUNICATIONS NETWORK

RELATED APPLICATIONS

This application is related to, and claims the benefit of the earlier filing date under 35 U.S.C. § 119(e) of, U.S. Provisional Patent Application No. 60/276,923, filed Mar. 20, 2001, entitled "IP Communications," U.S. Provisional Patent Application No. 60/276,953, filed Mar. 20, 2001, entitled "IP Communications," U.S. Provisional Patent Application No. 60/276,955, filed Mar. 20, 2001, entitled "IP Communications," and U.S. Provisional Patent Application No. 60/276,954, filed Mar. 20, 2001, entitled "IP Communications"; the entireties of which are incorporated herein by reference.

FIELD OF THE INVENTION

The present invention relates to communications systems, and is more particularly related to controlling the action of features in communications systems.

BACKGROUND

The proliferation of data transport networks, most notably the Internet, is causing a revolution in telephony and other forms of real-time communication. Businesses that have been accustomed to having telephony traffic and data traffic separately supported over different systems and networks are now moving towards so-called "converged networks" wherein telephone voice traffic and other forms of real-time media are converted into digital form and carried by a packet data network along with other forms of data. Now that the technologies are feasible to support it, voice over data transport offers many advantages in terms of reduced capital and operating costs, resource efficiency and flexibility.

For example, at commercial installations, customer premise equipment investments are substantially reduced as most of the enhanced functions, such as PBX and automatic call distribution functions, may reside in a service provider's network. Various types of gateways allow for sessions to be established even among diverse systems such as IP phones, conventional analog phones and PBXs as well as with networked desktop computers.

To meet the demand for voice over data transport, service providers and network equipment vendors are faced with the challenges of establishing new protocols and standards, recognizing new business models, implementing new services, and designing new equipment in a way that would have been difficult to imagine twenty years ago.

For establishing a communications session in a network, new protocols and control architectures have emerged. It is worth noting that these have been inspired by the migration to a voice over data but are not necessarily limited to such an environment. In some respects the protocols and control architectures described next may be used to establish calls through any form of transport.

Both the ITU H.323 standard and the IETF's Session Initiation Protocol (SIP) are examples of protocols which may be used for establishing a communications session among terminals connected to a network. The SIP protocol is described in IETF document RFC 2543 and its successors. Various architectures have been proposed in conjunction with these protocols with a common theme of having an address resolution function, referred to as a "location server," somewhere in the network to maintain current information on how to reach any destination and to control features on behalf of users.

In a SIP-controlled network, a variety of features and services may be implemented via a SIP server. These features include Centrex-type calling features (call forwarding) as well as advanced features such as SIP presence support, location management, and Find-Me capability. A typical feature in a communications network is call blocking. Call blocking is defined as the ability for an administrator to place outgoing call restrictions on individual users. For instance, administrators may make restrictions on outgoing calls to certain international phone number ranges for different individual users.

In addition to regular outgoing calls that a user directly places, outgoing calls can also be initiated as a side result of a feature invocation. For instance, call forwarding, call transfer, and other features, can result in an outgoing call indirectly. However, administrators may wish to apply different policies to these type of indirect calls, as opposed to direct calls. For instance, it might be ok to dial a Long Distance call directly from a business location for a particular user. But, it might not be acceptable for that same user to be able to forward calls to Long Distance, as this may lead to a fraudulent use of the phone from outside the business location.

This situation is depicted in FIG. 3A. FIG. 3A shows three parties which have specific permissions to place calls among one another in the context of a given communications system (not explicitly shown). In particular, Party A 301 may make calls to Party B 303, and Party B 303 may make calls to Party C 305. However, the network serving these parties is configured to prevent Party A from placing calls directly to Party C. For example, there may be long distance charges or tolls incurred in calling Party C. Party B may be authorized to incur such long distance charges and is allowed to place calls to Party C. On the other hand, call attempts from Party A to Party C may be blocked to avoid costly calls by Party A. A good example might be in a corporate setting wherein Party B is an employee of a corporation and is allowed to reach remote Party C, even if the call involves long distance charges. Party A may correspond to a courtesy telephone placed in the lobby at a business location or may be assigned to a contractor or temporary employee within the company. Party A is allowed to make calls within the company, but not to make outbound long distance calls.

As shown in FIG. 3B, a problem arises when Party B activates a call forwarding feature, or any other feature that triggers outbound calls. A call from Party A may be forwarded or redirected to Party C, resulting in a call that would have normally been blocked otherwise. Aside from providing a possible mechanism for fraud or for inadvertent accumulation of charges, this circumvention of normal screening may be a problem for other reasons. The unwelcome call from User A to the unaware User C might, for example, compromise personal security (harassment, stalking, annoyance calls), privacy or confidentiality (attorney/client or doctor/patient), or the security of a facility.

Without placing undue restrictions on Party B, it is desirable to control the ability of Party A to cause calls to Party C, regardless of what routing features are invoked by Party B.

SUMMARY

The need for separately controlling the handling of feature-generated contacts for a user independently of the outbound calling permissions of the user is addressed by the present invention. As is described in greater detail herein, feature-generated contacts may arise from processing of the destination user's profile in response to a session request or inbound call. More often than not, a contact generated by a feature, such as a routing feature, will be different information than is known by, or provided by, the requesting party.

In one aspect of the present invention, the screening control of feature-associated contacts is configurable apart from outbound calling permissions in a comprehensive approach that may be uniformly applied across an entire system. The present invention also provides for this configurability on a per-user or per-profile basis.

Further features and advantages of the present invention will be apparent to those of ordinary skill in the relevant art upon reading the following detailed description in conjunction with the accompanying drawings.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF AN
EXEMPLARY EMBODIMENT

In the following description, well-known structures and devices may be shown in block diagram form or otherwise summarized in order to avoid unnecessarily obscuring the present invention. For the purposes of explanation, numerous specific details are set forth in order to provide a thorough understanding of the present invention. It should be understood however that the present invention may be practiced in a variety of ways beyond these specific details. For example, although the present invention is discussed in the context of the Session Initiation Protocol (SIP) and an Internet Protocol (IP)-based network, one of ordinary skill in the art will recognize that the present invention may be generally applicable to other equivalent or analogous communication protocols (ITU H.323) or other communications networks (ATM, frame relay, etc.).

It should be understood throughout this disclosure that, although SIP-type messages are shown for convenience, any type of protocol or a mixture of such protocols may be applied in various parts of the overall system. In particular, the routing requests and responses between the proxy server and location server may strictly or loosely conform to SIP or some other standardized protocol, or may be proprietary in nature.

Figure 1:
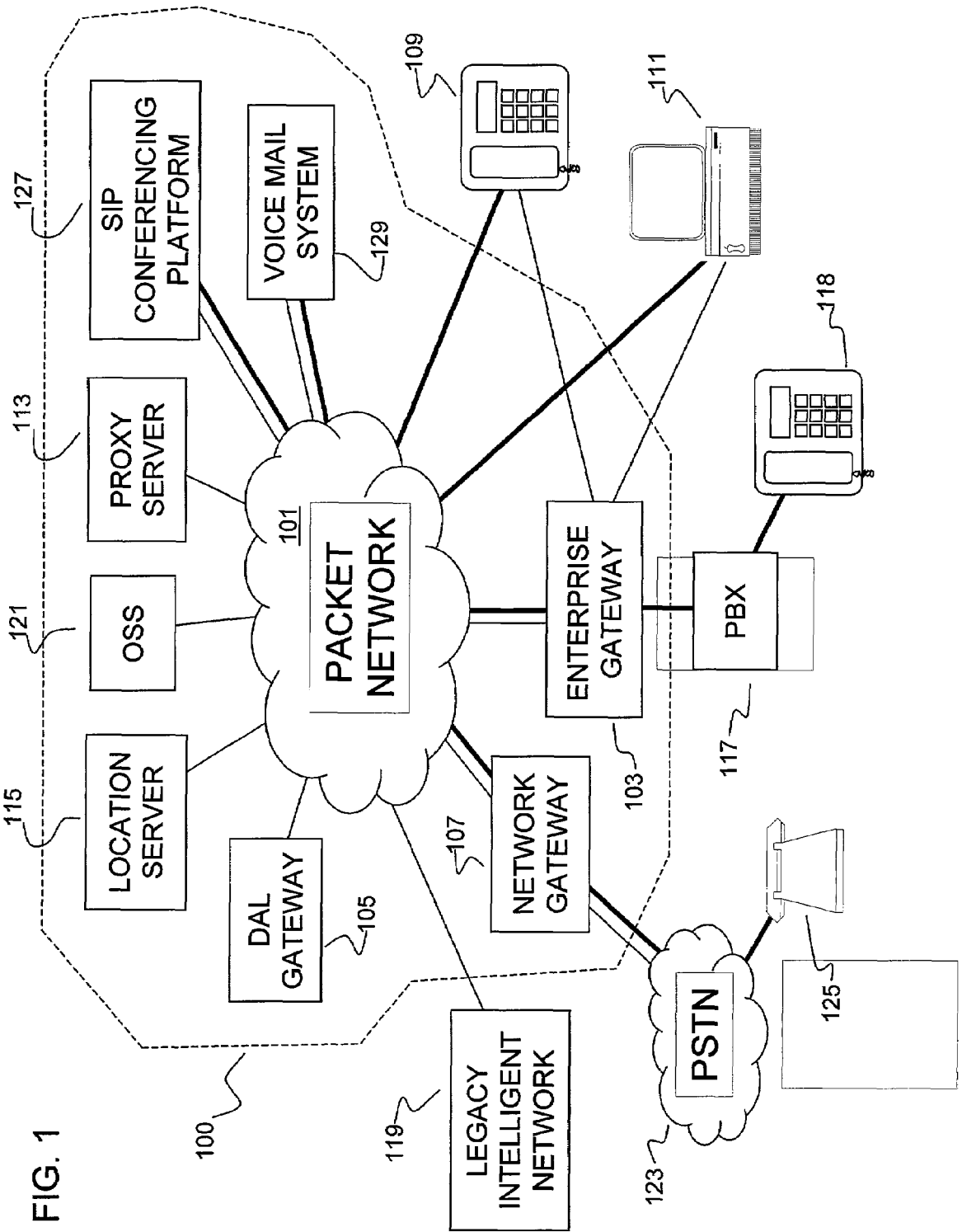
FIG. 1 is a diagram of a data communications system capable of supporting voice services, in accordance with an exemplary embodiment of the present invention.

FIG. 1 shows a diagram of a data communications system capable of supporting telephony or other real-time communications services, in accordance with an exemplary embodiment of the present invention. The communication system 100 includes a packet data transport network 101, which in an exemplary embodiment is an Internet Protocol (IP) based network. System 100 provides the ability to establish communications among various terminal equipment coupled thereto, such as telephone 125, PBX phone 118 and SIP phone 109. In practice, there may be thousands or millions of such terminal devices served by one or more systems 100.

As used herein, the term "SIP phone" refers to any client (e.g., a personal computer, a web-appliance, etc.) that is configured to provide SIP phone functionalities. The SIP phones 109 may take the form of standalone devices—e.g., a SIP phone may be designed and configured to function and appear like a Plain Old Telephone Service (POTS) telephone station. A SIP client 111, however, is a software client and may that run, for example, on a conventional personal computer (PC) or laptop computer. From a signaling perspective, these devices 109, 111 may operate quite similarly, with the main differences relating to the user interface. Unless otherwise stated, it is recognized that the functionalities of both the SIP phones 109 and the SIP client 111 are comparable and that the network operates similarly with either type of device.

The system 100 provides a number of elements to support the voice services, including an enterprise gateway 103, a Dedicated Access Line (DAL) gateway 105, a network gateway 107 and SIP conferencing platform 127. In particular, system 100 comprises the important elements of a proxy server 113 (also known as a network server (NS)) and a location server (LS) 115. Location server 115 serves as a repository for end user information to enable address validation, feature status, and real-time subscriber feature configuration. Additionally, LS 115 may store configuration information.

For the purposes of explanation, the capabilities of system 100 are described with respect to large enterprise users. It is noted that the feature/functionality of system 100 may be applicable to a variety of user types and communications needs. System 100 is able to support customers that maintain multiple locations with voice and data requirements.

As shown, enterprise gateway 103 provides connectivity from a PBX 117, which contains trunks or lines often for a single business customer or location (e.g., PBX phones 118). Signaling for calls from PBX 117 into the IP network comprises information which uniquely identifies the customer, trunk group, or carrier. This allows private numbers to be interpreted in their correct context. To interface to PBX 117, enterprise gateway 103 may use Integrated Digital Services Network (ISDN), Circuit Associated Signaling (CAS), or other PBX interfaces (e.g., European Telecommunications Standards Institute (ETSI) PRI, R2).

The Dedicated Access Line (DAL) gateway 105 is employed in system 100 to allow virtual private network (VPN) customers to be able to access their service even from a conventional telephone not served by the VPN.

Through system 100, communications may be established among the voice stations 125 that are serviced through the PSTN 123 and personal computers (e.g., PC 111) that are attached to packet data network 101.

Keeping in mind the similar nature of PC soft clients and standalone IP telephones, it maybe said that four possible scenarios exist with the placement of a voice over IP call: (1) phone-to-phone, (2) phone-to-PC, (3) PC-to-phone, and (4) PC-to-PC.

In the first scenario of phone-to-phone call establishment, a call from the phone 125 is switched through PSTN 123 by a switch to the network gateway 107, which forwards the call through the IP backbone network 101. The packetized voice call is then routed through network 101, perhaps to another similar network gateway 107, to be at another PSTN phone (not shown).

Under the second scenario, the phone 125 places a call to a PC through a switch to the PSTN 123. This voice call is then switched by the PSTN 123 to the SIP network gateway 107, which forwards the voice call to a PC 111 via the network 101.

The third scenario involves a PC 111 that places a call to a voice station (e.g., phone 125). Using a voice encoder, the PC 111 introduces a stream of voice packets into the network 101 that are destined for the SIP network gateway 107. The SIP network gateway 107 converts the packetized voice information into a POTS electrical signal, which is circuit switched to the voice station (e.g., phone 125).

Lastly, in the fourth scenario, a PC 111 establishes a voice call with another PC (not shown); in this case, packetized voice data is transmitted from the PC 111 via the network 101 to the other PC (not shown), where the packetized voice data is decoded.

As mentioned, system 100 may employ SIP to exchange session setup messages. Another popular session establishment protocol is referred to as the H.323 protocol, although it is actually a set of related protocols promulgated by the International Telecommunication Union (ITU) for accomplishing multimedia communication. SIP is an alternative standard that has been developed by the Internet Engineering Task Force (IETF). SIP is a signaling protocol that is based on a client-server model, generally meaning that clients invoke required services by messaging requests to servers that can provide the services. Similar to other IETF protocols (e.g., the simple mail transfer protocol (SMTP) and Hypertext Transfer Protocol (HTTP)), SIP is a textual, humanly readable protocol.

It may be noted that neither the H.323 or SIP protocols are limited to IP telephony applications, but have applicability to multimedia services in general. In one embodiment of the present invention, SIP is used to establish telephone calls and other types of sessions through system 100. However, it will be apparent to those of ordinary skill in the art that the H.323 protocol (with some modifications or extensions) or other similar protocols could be utilized instead of SIP. Separate from SIP, but often used in conjunction with SIP, is the Session Description Protocol (SDP), which provides information about media streams in the multimedia sessions to permit the recipients of the session description to participate in the session.

The Internet Engineering Task Force's SIP protocol defines numerous types of requests, which are also referred to as methods. An important method is the INVITE method, which invites a user to a conference. Another method is the BYE request, which indicates that the call may be released. In other words, BYE terminates a connection between two users or parties in a conference. Another method is the OPTIONS method. This method solicits information about capabilities without necessarily establishing a call. The REGISTER method may used to provide information to a SIP server about a user's present location.

Details regarding SIP and its call control services are described in IETF RFC 2543 and IETF Internet Draft "SIP Call Control Services", Jun. 17, 1999; both of these documents are incorporated herein by reference in their entireties.

Transmission of SIP messages can take place in an IP network through the well known User Datagram Protocol (UDP) or through the more reliable Transaction Control Protocol (TCP). Whereas SIP, H.323, or other protocols may be used to establish sessions through a data network, the actual media or "traffic" that is to be communicated among users may take place according to the well known Real-time Transport Protocol(RTP) as described in the IETF document RFC 1889.

It is likely, though not essential, that all of the call control signaling (SIP, H.323), media traffic(RTP/RTCP) and network management and provisioning will be communicated through common transport network 101. Thus, in FIG. 1, all of the elements appear in a hub arrangement around transport network 101.

In the traditional telephone network, calls are directed to specific locations or terminal devices uniquely identified by the called telephone number. In contrast, system 100 enables the caller to specify a called party to be reached independent of any particular location or terminal.

The user may move from one terminal to another and, at each terminal, may register as being present so that inbound calls are directed to the most recently registered location. Furthermore, a user may have both personal and group-wise profile settings that affect the activation of features, such as call blocking, even as a function of the time of day.

Because of the dynamic nature of user location and of call handling features, each request to establish a session is first routed to a proxy server so that user permissions may be verified, destination addresses may be found, and special features related to a user or a business may be applied to the call. Requests are serviced internally or by passing them on, possibly after translation, to other servers. A proxy interprets, and, if necessary, rewrites a request message before forwarding it.

In general, location server 115 accepts a routing request, such as from a proxy server, and determines addresses or "contacts" corresponding to the destination party expressed in the routing request. In response to the request, the location server may return a redirect response comprising contact information for the party. It is noted that messaging between NS 113 and LS 115 may use a modified version of SIP. For example, SIP acknowledge messages may be unnecessary between NS 113 and LS 115. Otherwise, messaging among network functions, such as NS 113 and LS 115, may use standard SIP or even non-SIP alternatives.

System 100 further includes an Operational Support Systems (OSS)121 to provide provisioning, billing, and network management capabilities. OSS 121 may provide an environment or an interface, such as a web-based interface, for provisioning many aspects of dialing plans, user permissions and how features operate on behalf of each user. Many of these aspects are configured via OSS 121 by changing information within location servers or databases within system 100. Some specific features that may be configured by OSS 121 include legacy Centrex features such as Unconditional Call Forwarding, Conditional Call Forwarding, Call Blocking and Call Screening.

One feature that may be configured involves the so-called "Find-Me" service. A Find-Me schedule provides a mechanism to route calls using a list of possible destinations, wherein each destination is tried in turn. A Find-Me list may be specified to apply during a time-of-day or day-of-week or may be associated with different categories of calling numbers. Furthermore, a default Find-Me list might be provisioned to determine general handling when the more specific Find-Me lists are not in effect.

The possible destinations in a Find-Me list can be specific addresses associated with an account's profile. For instance, a specific cell-phone number or wire-line phone number can be a possible destination address. Furthermore, as a user registers their presence at a terminal, such as a SIP phone, the address of the terminal may be temporarily added to the Find-Me list.

For a SIP phone profile, the Find-Me list can contain specific destination addresses provisioned in the user profile, and/or a reference to current registered addresses. For a traditional phone behind an enterprise gateway profile, the Find-Me list can contain specific destination addresses provisioned in the user profile and/or a reference to the user's PBX-phone. The Find-Me list feature can be enabled for a user during account creation and then updated by the user. Entries made to the Find-Me list may be verified against the Feature Blocking List for the subscriber's dial plan. The user profile has a link to update the Find-Me list. Specifically, the system 100 allows the user to Create, Read, Update, and Delete an inventory of potential devices, which can be used for populating Find-Me listings.

SIP phones 109 allow users to register and de-register, or login and logout, from the phone. In an exemplary embodiment, to provide mobility, SIP phones 109 permit usernames and passwords to be entered for visitors. By logging in, incoming calls to the visitor's profile are directed to the phone. When a visitor logs in, SIP phones 109 register the visitor with the Network Server 113 and Location Server 115. Any incoming call to any of the profiles registered by the phone can be directed to the phone. Network Server 113 and Location Server 115 may respond similarly to both situations where a user is logged in as a visitor or where the user is logged in to their usual home device, if there is one.

A "Do Not Disturb" feature may be available at a terminal so that incoming calls are declined and, in the case of telephones and pagers for example, no ringing occurs to disturb users nearby. When "Do Not Disturb" is invoked on a SIP phone 109, the SIP phone 109 returns a Busy message if contacted by NS 113. For example, the phone returns a busy signal instead of ringing when an incoming call arrives. When the SIP phone 109 returns a "486 Busy" message, the Network Server 113 and Location Server 115 can make intelligent routing decisions based on a user profile, such as whether a Call Forwarding On Busy feature has been provisioned.

In an exemplary embodiment, system 100 utilizes the Session Initiation Protocol (SIP) for establishing communications sessions.

Briefly, a session is initiated in the following manner: The proxy server first receives a request, such as a SIP "INVITE" message, typically from a calling station where a first user desires to contact a second user. The second user may be identified by telephone number, IP address, or uniform resource locator (URL), for example. The proxy server may then relay a routing request to the location server for such purposes as verifying the privileges of the first user to reach the second user, finding one or more locations for the second user and performing any call handling features provisioned for the first or second users. Generally, the location server responds to the proxy's request by returning to the proxy server one or more addresses of terminals where the second user may be contacted.

Upon receipt of the address information from the location server, the proxy server commences to send an "INVITE" message, or the like, to each address. Thus, the proxy server attempts to reach the second user by trying the addresses either serially or in parallel.

Multiple addresses may be returned by the location server if, for example, a given user profile indicates a "Find-Me" list, that is, a set of contacts that should be tried for reaching the second user being called. By provisioning of their profile maintained by the location server, a user may specify, for example, that incoming calls go to an IP telephone first, then another phone, then a mobile phone and, if there is still no answer at those locations, then into a voice mail system.

Figure 2:
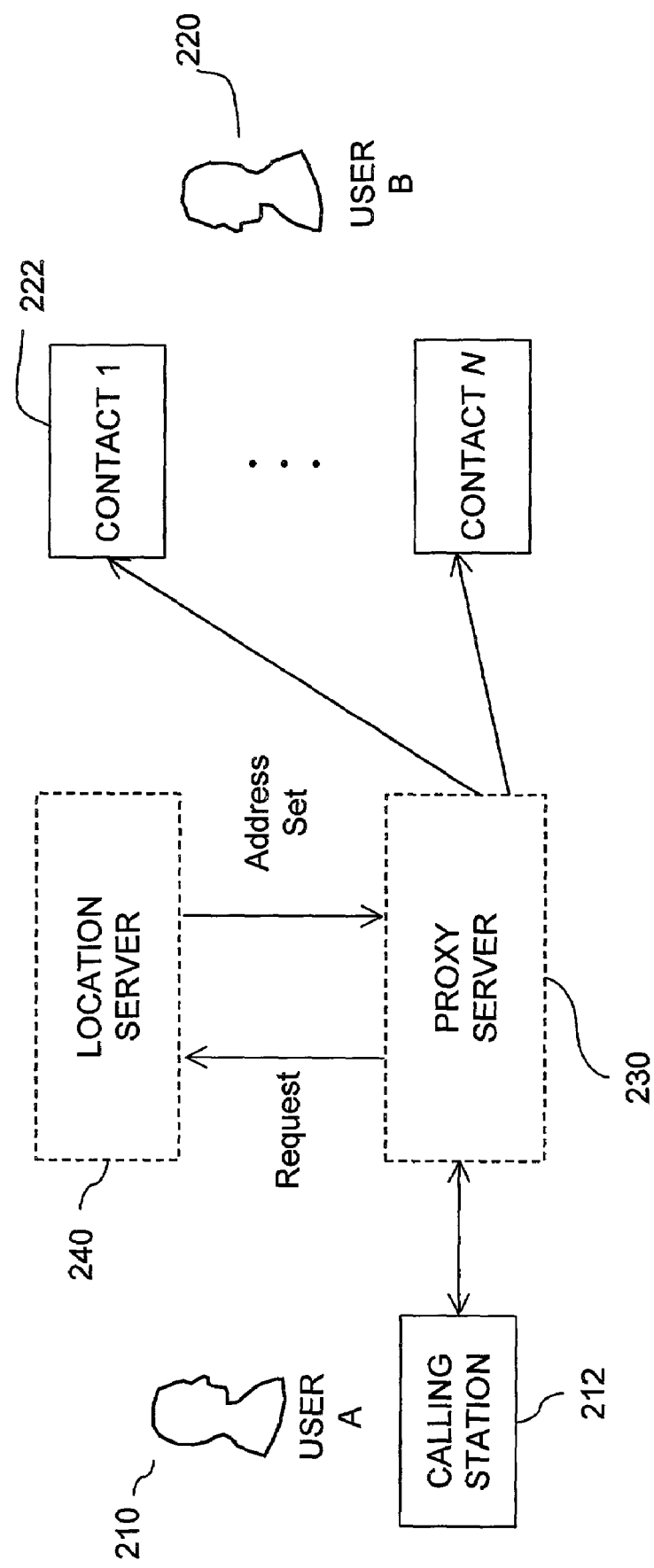
FIG. 2 is a diagram of functional elements involved in establishing a session among parties according to an exemplary embodiment of the present invention.
Figure 3A:
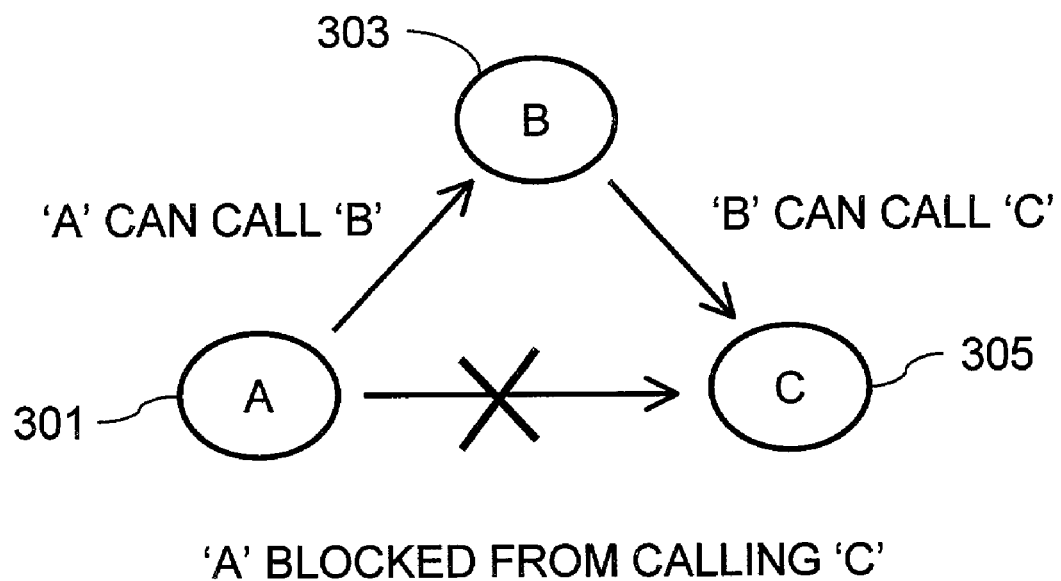
FIG. 3A–3B are pictorial representations of calling permission arrangements among several parties according to the prior art.
Figure 3B:
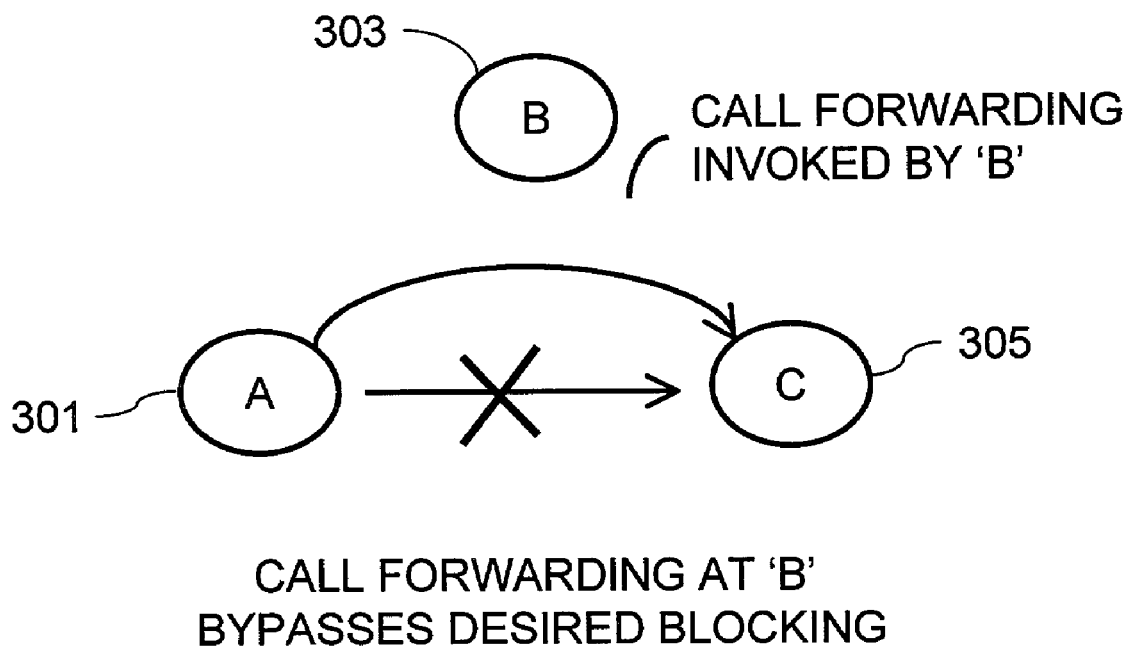

To better describe the interaction between a network server or proxy and a location server, a simple call scenario is now described in FIG. 2.

FIG. 2 is a diagram depicting the typical interaction of basic elements according to the prior art to perform a session setup by using the SIP protocol. Communications among these elements will typically take place through a common packet data network such as network 101 in FIG. 1.

In FIG. 2, User A 210 desires to establish communications with User B 220. User B 220 may be reachable at any one of several addresses. These addresses or contacts may correspond to conventional telephones, IP phones, wireless phones, pagers, etc. The list of addresses may even be changing as User B moves about and registers as being present at various terminal devices 222. The current information about User B's contact information is typically maintained in location server 240 or in a presence registry of some type not shown here.

To initiate contact, User A 210 accesses a terminal, calling station 212, and specifies User B as the destination to be reached. This expression of the specific desired destination may take the form of dialing of digits or of selecting a user name or URL-style address from a list. In some cases, User A may also be able to express what type of session is desired (video, high quality, messaging, etc.) or specify a desired quality level for the session. Once the request is specified at station 212, a SIP "INVITE" message describing the request is composed and sent to proxy server 230.

Proxy server 230 typically forwards a request to location server 240 to retrieve one or more contacts at which User B might be reached. As described earlier, proxy server 230 consults location server 240 for a variety of purposes, such as invoking profile-controlled feature behavior and obtaining the latest known location information pertaining to User B.

Location server 240 analyzes the request and responds to proxy server 230 in one of several possible ways. Location server 240 may disallow the session if User A is not permitted to contact User B, if User B's address cannot be recognized, or if User B has a feature activated that renders User B unreachable by User A.

Location server 240 may determine that User A is allowed to contact User B and may even find multiple addresses at which User B may be reachable. If this is the case, location server 240 returns a SIP "300 Multiple Choices" message containing a list of the contacts to be tried.

Upon receiving such a response, proxy server 230 then commences trying the contacts to see if User B can successfully be reached at any of the corresponding terminals 222. This "Find-Me" functionality is usually carried out in sequence starting with the most recent registered location or following a specific order as provisioned for User B (phone then pager). In some configurations, it is conceivable that proxy server 230 may attempt all contacts in parallel. An attempt to establish contact with a terminal 222 involves sending a SIP "INVITE" to the terminal and waiting for a reply indicative of success or failure.

Figure 4:
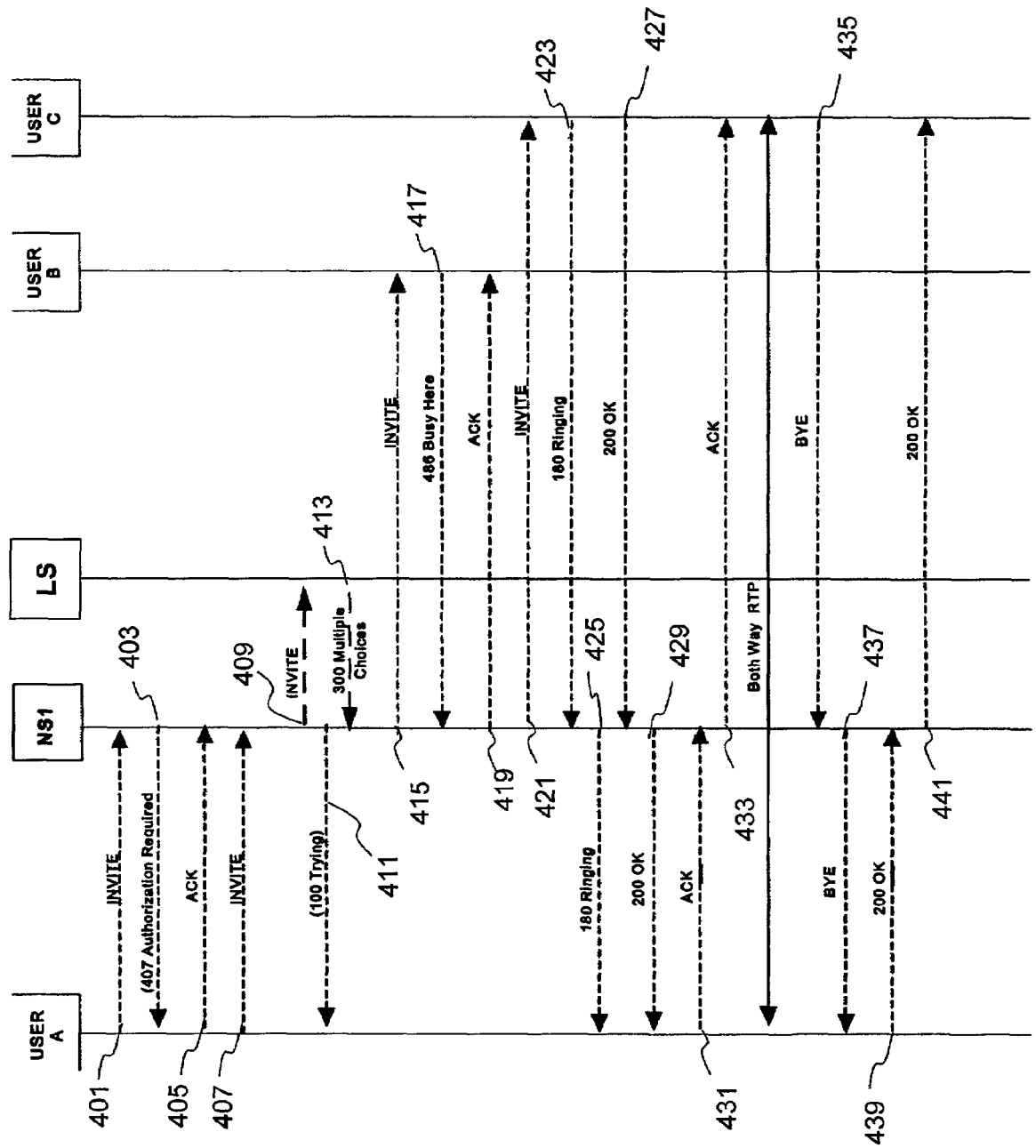
FIG. 4 is a call flow diagram depicting a sequence of messaging events related to performing a call forwarding feature in a communication system.

FIG. 4 is a call flow diagram depicting a sequence of messaging events related to performing a "call forwarding on busy" feature in a communication system. In this scenario, User A calls while User B is busy, and User B has the "Call Forward on Busy" featured configured to send such calls to User C.

User A "calls" User B by sending an INVITE message to the Ai,Sl, as in step 601. For purposes of authorizing the call, NS1 may respond with "407 AUTHORIZATION REQUIRED" message as shown in step 403. User A acknowledges the response in step 405 as is customary in the SIP protocol. In practice, the response in step 403 carries a challenge or "nonce" in the form of a character string or number. To achieve authorization, the User A terminal is expected process the nonce value and generate a response to accompany a subsequent, separately submitted INVITE request. This subsequent request containing the user terminal'ss authorization response is depicted as the INVITE message of step 407.

Now recognizing a valid response to the previous authorization challenge, NS1 commences with processing the INVITE request by sending routing request, in the form of INVITE request 409, to a location server (LS). Meanwhile, in step 411, NS1 sends back a provisional "100 Trying" response back to the User A terminal.

Soon after, the LS responds to the proxy with a set contacts of represented by a SIP "300 Multiple Choices" message in step 413. These contacts refer to the User B terminal and User C terminal. User B might be listed as a contact in the usual sense, whereas User C may be designated as a "cfb" contact address to be used for forwarding if the first address is busy.

In step 415, proxy NS1 acts upon the first contact by sending an INVITE message to User B. In step 417, the User B terminal sends back a "486 Busy Here" response indicating that the terminal is busy, perhaps already involved in a different session or set to a "Do Not Disturb" mode as described earlier.

NS1 acknowledges receipt of the busy indication in step 419 and then proceeds to try the "cfb" contact address, namely User C. The INVITE message goes to User C in step 421 and a "180 Ringing" response is returned in step 423. User C is at least not "busy" and is ringing or otherwise signaling the incoming call attempt from User A.

The ringing response returned from User C in step 423 is propagated back to User A in step 425 so that User A receives a "ringback" signal similar to the audible ringing sound that is heard over conventional telephones.

When User C answers the call, a "200 OK" message is returned by User C in step 427 and is propagated back to User A in step 429. In some cases, the OK response may comprise a session descriptor describing parameters for the session to be established between User A and User C. In other cases, User A will have already proposed these parameters in earlier INVITE messaging. These parameters may include media type, sampling rate, codec schemes, etc. (Note that, in the traditional telephone network, these were all inherently fixed values and never had to be specified or negotiated among communicating parties.

User A acknowledges in step 431 and the acknowledgement is "proxied" to User C in step 433. Once this exchange has occurred, User A and User C are aware of each other's addresses and an RTP media stream is established between the user terminals using the mutually agreed upon session parameters.

This two-way media communication (full duplex telephony) continues until, in this case, User C decides to terminate the call. In response to User C "hanging up" a "BYE" message is sent to NS1 in step 435 and is in turn sent to User A in step 437. This instructs User A that the session is to be terminated—User A should cease sending packets to User C and stop expecting for packets from User C. User A sends back an acknowledgement in steps 439 and 441. The judicious use of acknowledgement in the messaging scheme ensures that important control messages are received. Elements such as NS1 are configured to re-send a control message if no receipt is acknowledged after a time. This scheme compensates for the fact that these messages typically are sent using unreliable transport mechanisms such as the User Datagram Protocol (UDP).

Figure 5:
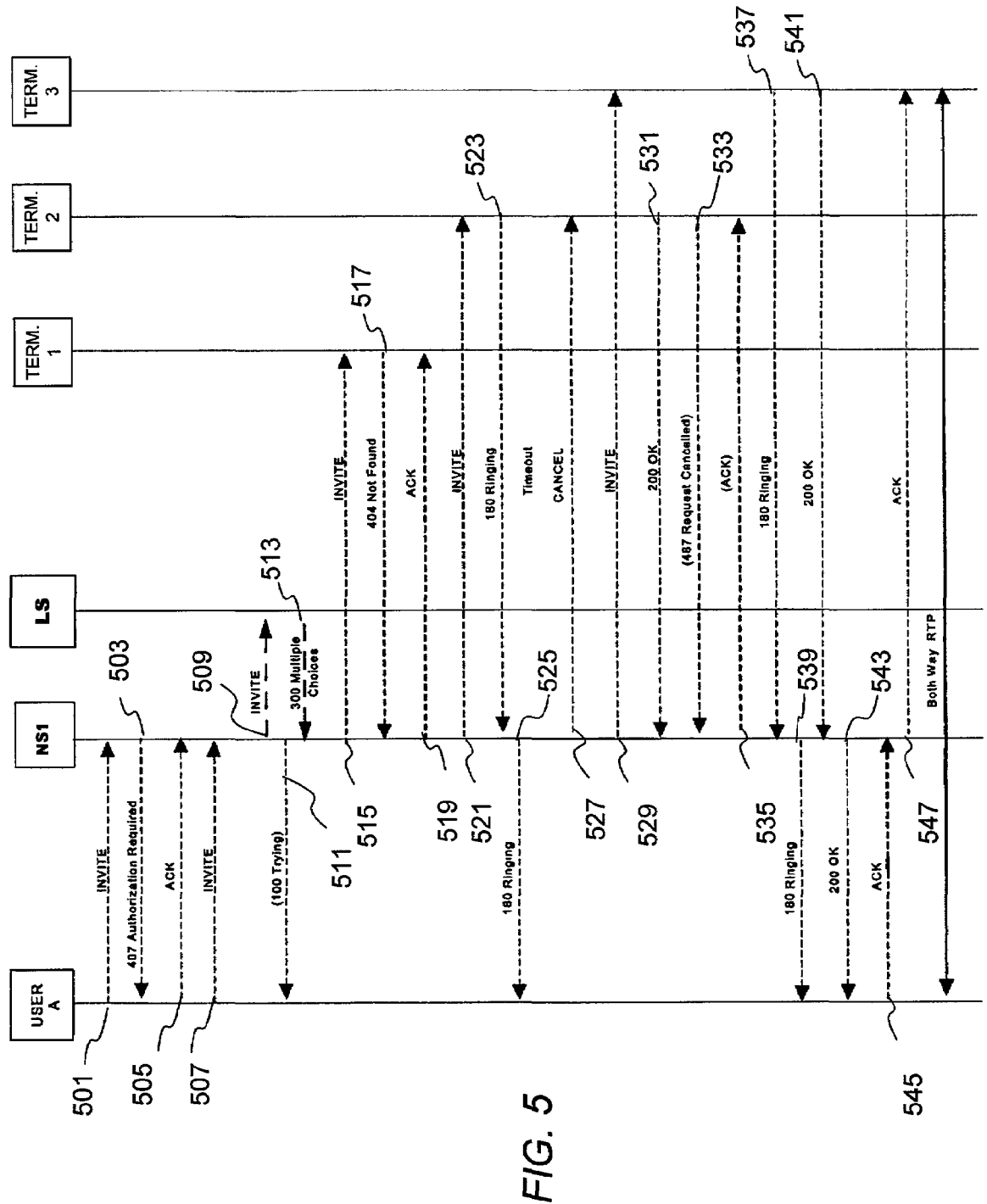
FIG. 5 is a call flow diagram depicting a sequence of messaging events related to performing a sequential "find-me" feature in a communication system.

FIG. 5 is call flow diagram depicting the typical sequence of messaging that occurs among various elements when a "find-me" feature is invoked. Again, SIP messages are shown by way of example, but other protocols could be used in pursuit of similar functionality. In this example, the station associated with User A is denoted "User A." However, because User B may be associated with any number of devices (or clients) under the Find-Me feature, these devices are referred to as "Terminal 1", "Terminal 2", and "Terminal 3." It is noted that, in general, any number of terminations (i.e., destination clients) may be specified in the Find-Me list of User B. Under this scenario, it is assumed that User B is eventually reached via Terminal 3.

Each terminal device User A and Terminals 1, 2, and 3 can be a SIP phone or other type of phone and may be coupled through an enterprise gateway or a network gateway 107 or the like. User B has a Find Me feature as part of their profile, resulting in multiple contacts to be tried. Based on this, NS1 responds to User A's request to reach User B by sending INVITE messages first to Terminal 1, then Terminal 2, then Terminal 3, where the call finally completes. In this example, Terminals 1, 2 and 3 are assumed to be SIP phones. Each instance of a message being sent from one element to another will be referred to as a step, as in a process or sequence.

In step 501, a SIP "INVITE" message indicating User A's intent to reach User B is sent from User A's terminal to the proxy, NS1. In step 503, the proxy responds with a SIP "407 Authorization Required" message to challenge the authenticity of User A before honoring any requests. To provide closure on this initial exchange, User A sends back a SIP acknowledgement message to the proxy in step 505.

User A subsequently repeats the INVITE request in step 507, but this time includes an authentication header in response to the challenge of step 503. If the authentication of User A is satisfactory, then, in step 509, the INVITE is forwarded to the location server. The location server begins examining the request and determining whether User B has a profile and what features are currently active. In the meantime, in step 311, a "100 Trying" provisional response is sent back to the User A terminal as a call progress indicator of sorts. Soon thereafter, the location server responds in step 313 with a SIP "300 Multiple Choices"

message indicating that it has found the Find-Me list for User B. This response comprises a list of contacts at which communication with User B should be attempted, in this case Terminals 1, 2 and 3.

The proxy NS1 then begins trying the contacts sequentially. In step 515, NS1 sends an INVITE message to Terminal 1, whereupon Terminal 1 responds in step 517 with a "404 Not Found" message. This indicates that User B will not be reachable at Terminal 1. NS1 acknowledges the "404" message by sending back an "ACK" message in step 519. Without this acknowledgement, Terminal 1 would repeat the "404" response at intervals to make sure its response had been received.

In step 521, proxy NS1 attempts contact via Terminal 2 by sending an INVITE message. In step 523, Terminal 2 sends back a "180 Ringing" provisional response as a progress indicator telling the calling party that the terminal is ringing (telephone) or otherwise alerting users in the vicinity of an incoming call. In step 525, this ringing message is passed from the proxy to the User A terminal. Eventually, after Terminal 2 has been ringing for awhile without being answered, a timeout is declared and NS1 issues a "CANCEL" message in step 527 so that Terminal 2 will stop ringing.

Proxy NS1 then tries to reach User B via Terminal 3 and sends an INVITE message to Terminal 3 in step 529. While this new contact is being started, Terminal 2 happens to respond to the earlier "CANCEL" by sending back a "200 OK" message in step 531. Terminal 2 then sends a "487 Request Cancelled" message in step 533 to indicate its understanding of the recent cancellation. Proxy NS1 terminates the transaction with Terminal 2 by sending an "ACK" in step 535 confirming that the call attempt to Terminal 2 is cancelled.

In step 537, Terminal 3 sends back a "180 Ringing" response, which is repeated back to User A in step 539. In step 541, Terminal 3 sends a "200 OK" message indicating that the call has been accepted at this terminal. The "200 OK" is sent back to the User A terminal as well in step 543. Acknowledgement of the viable connection is returned in steps 545 and 547. At this point, User A's terminal and Terminal 3 are now mutually aware of each other's addresses and a two-way RTP media connection may be established through the network between User A and User B.

The call flows of FIG. 4 and FIG. 5 show typical situations wherein the location server performs feature processing and returns to the proxy, NS1, a resulting set of contacts for the destination party being sought. In the prior art, these contacts are not individually screened to ensure that desired calling restrictions are observed even when features are invoked. The ability to screen feature-generated contacts, and especially to distinguish such handling from the originating permissions for a user, depends on user profile information maintained in the communication system and provisioned by OSS 121 or other means.

Figure 6:
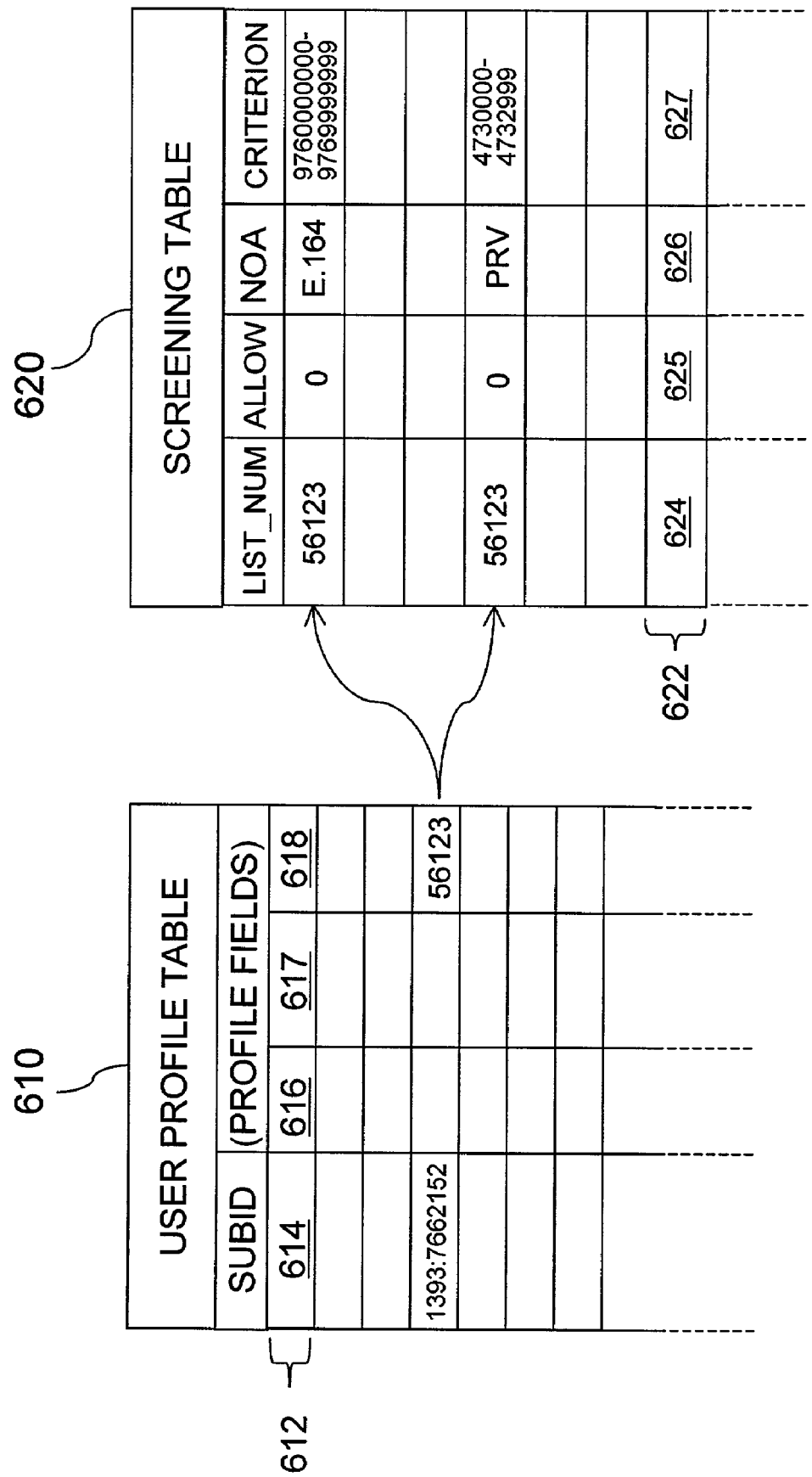
FIG. 6 is a diagram of data structures useful for implementing feature blocking in accordance with an exemplary embodiment of the present invention.

With respect to user profile information, FIG. 6 depicts a pair of data structures which may be used to implement the present invention when populated in a manner that will now be described.

User Profile Table 610 is shown to comprise user profile records 612. Each user profile record provides a set of values that control service processing. Various ones of these values may be set by provisioning activities through OSS 121 or may be user-configurable through a web-based interface or a SIP phone, for example. Some values may provide indices to yet other tables, such as a listing of currently registered locations for the user.

Each record in User Profile Table 320 represents a unique user profile within system 100, and generally corresponds to an individual user. The SUBIDs in User Profile Table 320 have to be unique. As those of ordinary skill in the art will appreciate, a SUBID may be derived from, for example, the combination of a unique dial plan identifier along with a listing identifier that is unique within that dial plan.

A dialing plan ID is a function of a particular enterprise customer having a VPN with its own dialing plan. The dialing plan ID ensures that multiple VPNs can coexist and be adequately differentiated in system 100. For example, an originator dialing extension "2665205" in a private network belonging to Company A should reach the intended destination within Company A, even if Company B sharing the same system 100 happens to also have a "2665205" location in its private numbering plan.

In the example of FIG. 6, each record 612 in User Profile Table 610 is shown to comprise profile fields 616, 617 and 618 which may each have values that control different aspects of service processing. For example, the value in field 616 for each record may affect originating call screening or "OCS", meaning the permissions for the user to originate calls. The value in field 617 may affect terminating call screening or "TCS", meaning calls that the user may accept from others. In particular, the value in field 618 may control feature-associated call screening or simply "feature blocking" or "FBL".

A Screening Table 620 is also shown comprising screening criteria records 622. Each record 622 is shown to comprise several fields, including a LIST_NUM field 624, an ALLOW field 625, a Nature-of-Address field 626 and a criteria field 627. Each record in Screening Table 620 describes outbound origination and inbound termination permissions in the communications system. The LIST_NUM field 624, when populated, identifies one or more related records in table 620. The criteria field 627 expresses a particular value (such as an IP address) or a range of values (telephone numbers within a certain range) for comparison to numbers being screened. Nature of Address (NOA) field 626 expresses the types of addresses to which the record pertains. Naturally, a given criteria expressed in the field is only meaningful in the context of a particular address type, such as an IP address, E.164-type telephone number or a private number.

The ALLOW field 625 conveys the sense in which the record is to be interpreted. With one value in the ALLOW field, a record may express that any numbers (telephone numbers or IP addresses) which fulfill the criteria set forth in criteria field 627 are to be disallowed. With another value in this field, the record may be interpreted such that numbers in the criteria field are the only numbers that may be allowed. Note that the type of screening that criteria is applied to is not a function of record 622 itself, but rather which of the fields 616,617 or 618 contained the "pointer" to record 622.

Tables 610 and 620 are maintained by, or are accessible to, a location server 115 for supporting real-time feature processing in system 100. In the course of handling a session request in system 100, location server 115 will consult the user profile table to determine how to act upon the request based upon user settings in the table.

A record in table 610 may have fields that reference specific records in other tables. In particular, FBL field 618 may contain a value that corresponds to one or more records in screening table 620. For example, as shown in FIG. 6, the fourth record in table 610 has a value in the FBL field corresponding to two separate records 622 in table 620. For efficiency in locating records, it is conceivable that the records in screening table 620 may be sorted in order of LIST_NUM values or that a hash table of some kind may be used.

It is contemplated that a single instance of screening table 620 may hold records affecting all forms of screening, that is, OCS, TCS and FBL. The uniqueness of values in the LIST_NUM field, as well as careful entry of values in fields 616, 617 and 618 ensures that OCS, TCS and FBL records may coexist in table 620 without confusion. Alternatively, another field might identify each type of record or separate tables might be used for supporting OCS, TCS and FBL functions separately. As those of ordinary skill in the art will appreciate, many variations are possible and various performance parameters, such as throughput and the ease of updating table values, will drive the design of a working implementation.

Figure 7:
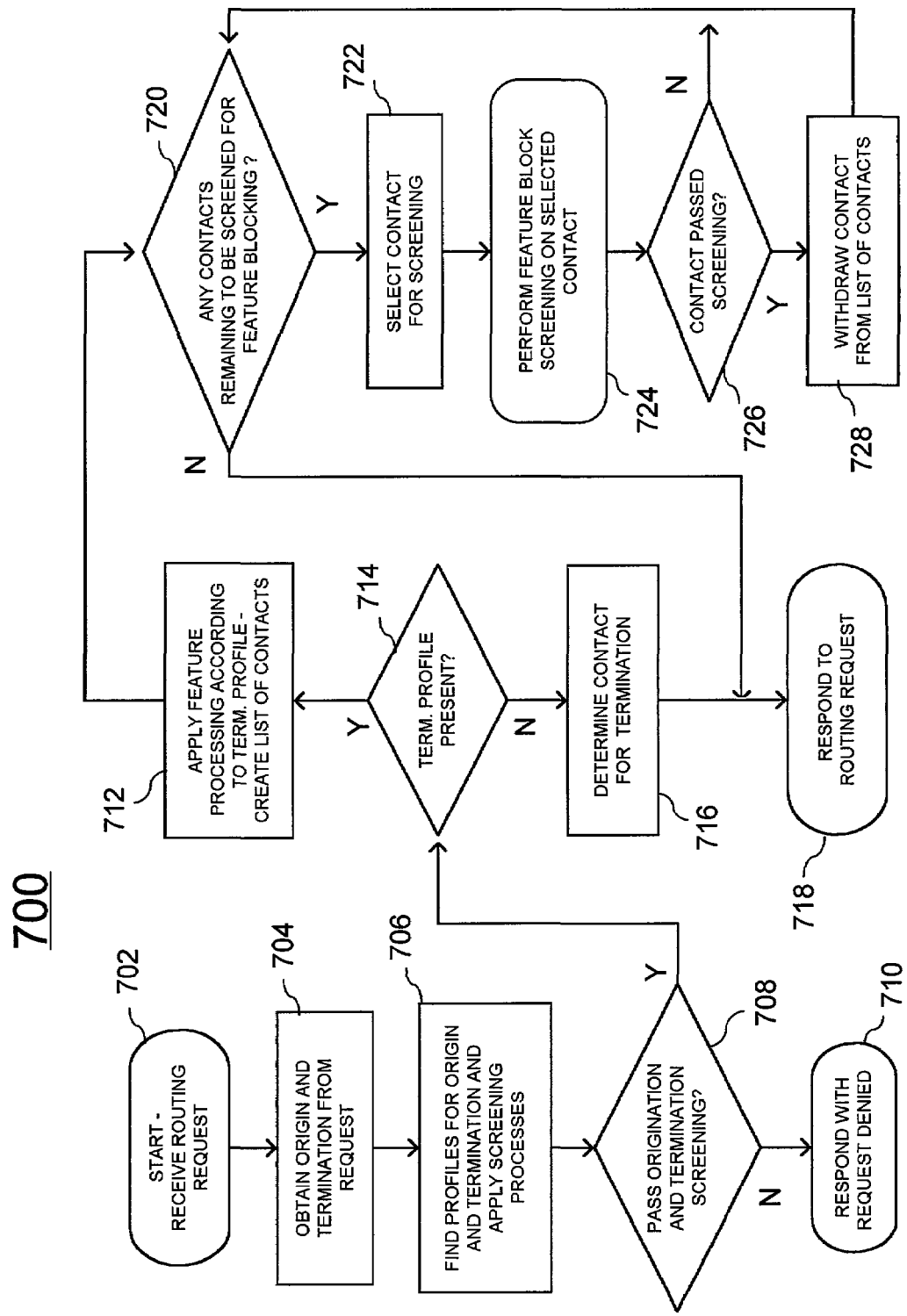
FIG. 7 is a flowchart describing a process for handling routing requests and incorporating feature blocking aspects in accordance with an exemplary embodiment of the present invention.

FIG. 7 shows a process 700 for handling session requests, including novel provisions for performing feature-associated call screening. Process 700 may be performed within location server 115, for example. Process 700 commences in step 702 upon the receipt of a routing request from a proxy server or the like. The routing request is submitted to the location server, perhaps in response to a session request initiated by an originating user.

In step 704, the routing request is interpreted or parsed to identify the origin of the call and the intended destination party or termination for the call.

In step 706, user profiles, if any, for both the origin and termination are obtained from a database of some sort accessible to the location server. As mentioned before, a principle role of the location server is to retrieve and apply information about users that affects service processing. Part of the information available from such profiles describes outbound calling permissions for the originating party and acceptable inbound calls for the terminating party. In the context of a particular routing request received in step 702, both of these factors affect whether or not the session request is permissible. Step 706 further entails applying these originating and terminating screening criteria.

In step 708, the result of the screening is evaluated and, if the call fails to pass such screening, execution proceeds to step 710 wherein a denial response is returned to the proxy in answer to the routing request that was received in step 702.

Otherwise if, in step 708, it is determined that the call request passes screening, then, in step 714, it is further determined whether the terminating profile is available, as may have already been discovered earlier in step 706. If the terminating profile is not accessible, then no features are specified for the terminating user. Consequently, there is no need for feature processing nor feature-associated call screening and the processing moves to step 716 to provide contact information without involving feature invocation and to convey this information as response back to the proxy in step 718.

Returning to step 714, if it is determined that a user profile for the terminating party is available, step 712 is performed to apply feature processing based upon the profile. For example, the terminating user'ss profile may indicate that a find-me feature is enabled and may provide a list of contacts to be tried. In accordance with the prior art, this list of contacts will normally be returned to the proxy so that the proxy may then try to reach the terminating party using these contacts.

Of course, there are a wide variety of possible features that might be implemented. The general manner in which these features are processed are well known and need not be explained to enable one of ordinary skill in the art to apply the present teachings. Furthermore, the specific manner in which such features processing might be implemented are subject to many implementation-specific details, preferences and arbitrary design choices, all of which have little bearing upon the operation of the present invention.

The net effect of such feature processing will generally be a "working list" of contacts for reaching the intended terminating party. After the feature processing of step 712, processing moves to step 720. Steps 720 through 728 implement a loop to screen each contact in the working list of contacts that was generated in step 712. In step 720, it is determined whether there are any contacts in the working list that have not already been screened.

Upon first entering step 720 from step 712, there may be multiple possible contacts, all of which have yet to be screened. Accordingly, a systematic screening of each contact will begin by next executing step 722. Another possibility upon entering step 720 from step 712 is that there are no contacts, perhaps due to feature processing that determines that the originator may not contact the terminating party at the present time. If there are no contacts, then the determination of step 720 causes execution to proceed to step 718, wherein a response is sent back to the proxy, in this case providing no contacts that the proxy should try.

Step 720 also encompasses the possibility that no feature block screening is configured for the terminating user. This may be evident, for example, from the lack of any value in the FBL field 618 of the terminating user's record 612 in User Profile Table 610. If this is the case, then execution proceeds to step 718, bypassing steps 722–728.

Returning to the situation where there are indeed contacts resulting from step 712 and assuming feature block screening is configured for the terminating party, step 722 involves selecting one of these contacts as a context for steps 724, 726 and 728. In step 724, a process is performed to screen the contact selected in step 722. As will be described in greater detail in FIG. 8, step 724 looks for feature blocking settings in the terminating user profile to determine if the contact is allowed to be included in the response which will eventually be sent back to the proxy in step 718.

Next, in step 726, if the contact passed the screening of step 724, then execution simply bypasses step 728 and proceeds back to step 720 to determine if any more contacts need to be screened. By the action of decision step 726, if the contact does not pass the screening of step 726, then step 728 is executed to remove the contact from the working list or otherwise render the contact unavailable to be returned to the proxy. After making the contact unavailable, execution proceeds back to step 720 to determine if any more contacts need to be screened.

Steps 720 through 728 are repeated for each contact. When it is determined in step 720 that all contacts have been screened, then the final set of contacts, if any, resulting from feature processing and feature-related screening are returned to the proxy in step 718 in answer to the routing request that was received in step 702. Process 700 is then concluded with respect to handling the one routing request.

Figure 8:
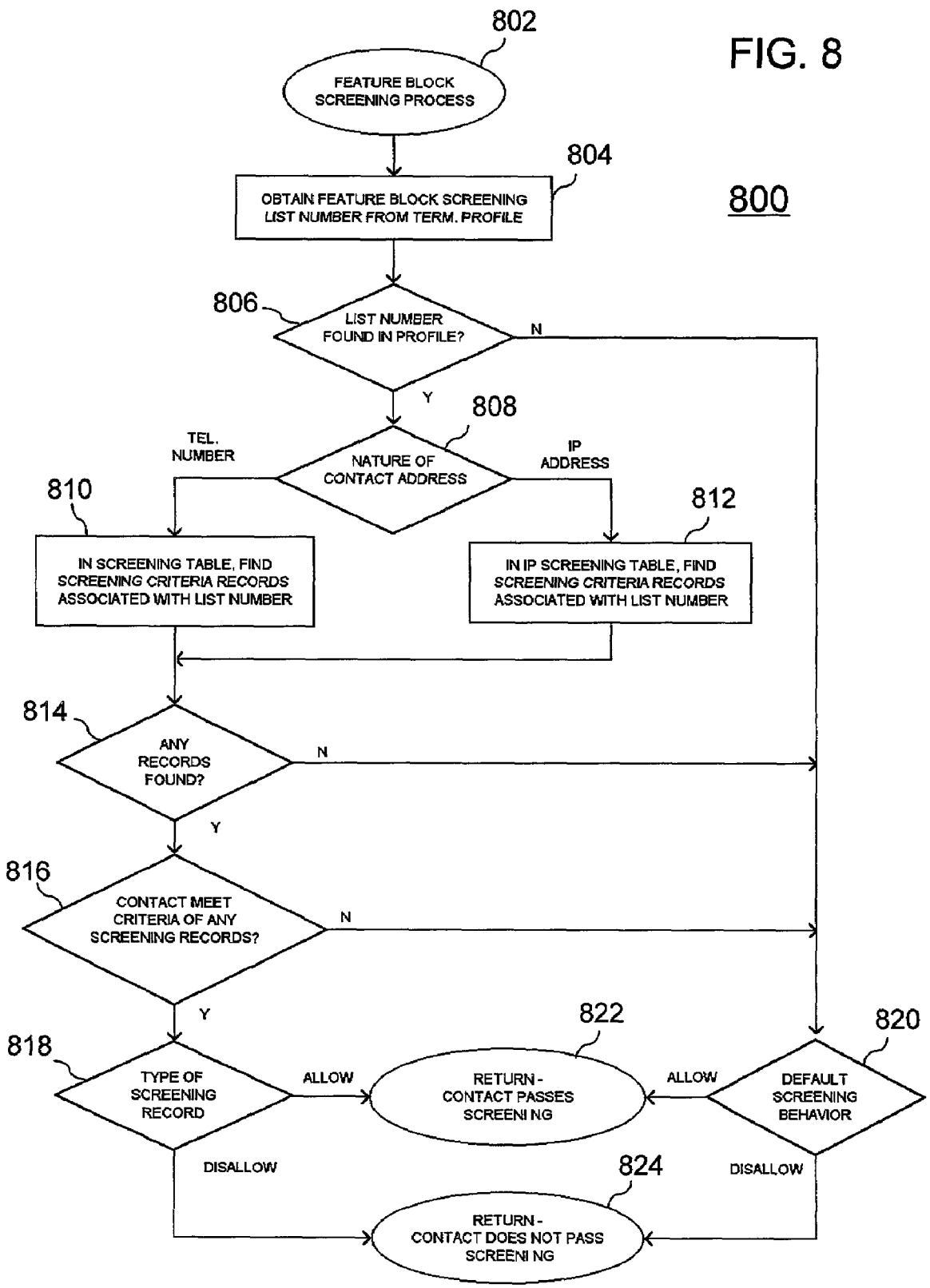
FIG. 8 is a flowchart describing a process for screening feature-associated contacts in accordance with an exemplary embodiment of the present invention.

FIG. 8 provides further description of how the feature blocking of step 724 may be implemented. Process 800 comprises a sequence of steps for applying configurable screening criteria to a particular call or session request. In particular, process 800 applies to checking contacts resulting from feature processing against feature block screening criteria expressed in the terminating user's profile coupled with a screening table. Process 800 may be viewed as a subroutine or callable function with a binary return value represented by the execution of either step 822, indicating that a contact passes screening, or of step 824, indicating the contrary.

It is worth noting that, in accordance with a novel aspect of the present invention, feature blocking criteria are expressed in the user's profile independently from other forms of screening criteria, such as originating and terminating screening criteria. Furthermore, as was evident in step 724 of FIG. 7, the point at which feature blocking criteria are applied is also novel and advantageous.

Process 800 commences in step 802 when a contact for a terminating party is to be tested against feature blocking criteria associated with the terminating user's profile.

In step 804, a "list number" is obtained from the terminating user's profile. For example, referring briefly to FIG. 6, a record 612 in User Profile Table 610 may have a field 618 that determines how feature blocking criteria may be obtained from screening table 620. Step 804 relates to obtaining the value in field 618 to be used as a record locator in screening table 620. The list number value so obtained will be compared to values in the LIST-NUM field 624 of screening table 620 in order to find applicable criteria records.

In step 806, it is determined whether a list number for feature blocking, such as field 618 in record 612, was actually found. In many cases, a given user will not have any feature blocking configured and this field may be non-existent or contain a null or zero value to represent the lack of that feature. If this is the case, then decision step 806 causes execution to pass to decision step 820, wherein the default screening behavior is assumed. It is foreseeable that the default behavior might be to allow all calls where feature screening is not applicable. It is also conceivable to have a system that defaults to disallowing all feature-related calls unless a feature block screening criteria is clearly met. Depending on the default screening criteria configured for the user or system, the outcome of screening process 800 may then be to either execute step 822, indicating that the contact passes feature block screening, or to execute step 824, returning an indication that the contact does not pass feature screening.

Returning to step 806, if a list number for feature blocking is located, then execution proceeds to step 808 wherein the type of address of the contact is used to differentiate among two different screening tables, one for private or public telephone numbers and the other for IP addresses. The difference in the tables could be the manner in which criteria, such as ranges of values, are expressed.

The "nature-of-address" is an attribute referring to the differences in format and significance between an IP address, an E.164 type telephone number having significance in the public telephone network, and a private (VPN) telephone number. Although two separate tables are described by way of example to accommodate IP addresses and telephone numbers, those of ordinary skill in the art will appreciate that many other arrangements are possible. For example, it is possible to have yet other tables relating to other address types, perhaps to accommodate new types yet to be developed. It is also conceivable to develop a scheme for various address types to coexist in the same data structure despite the differences in how criteria, such as ranges of addresses, might be specified for each address types.

If, in step 808, the nature of the contact address is determined to be a public or private telephone number, then execution continues with step 810 to use a screening table, as exemplified by screening table 620, to locate criteria records having a LIST_NUM value that matches the list number derived from the profile in step 804. In finding such records, the nature of address determined for the contact in step 808 is also used to select only those criteria records having a matching NOA field 626. This ensures, for example, that an E.164 contact is compared to E.164 criteria and not to any private number criteria that may also be configured for the terminating user.

Alternatively, if, in step 808, the nature of the contact address is determined to be an IP address, then execution continues with step 812 to use a different screening table, analogous to screening table 620 but perhaps better suited for specifying IP addresses, or ranges thereof. As with step 810, criteria records are located having a LIST_NUM value that matches the list number derived from the profile in step 804.

Regardless of whether step 810 is performed or step 812 is performed, execution then proceeds to step 814 to branch based upon whether or not any criteria records have been found in the appropriate screening table. If not, then execution proceeds to step 820 to invoke default behavior as described earlier.

Otherwise, if criteria records have been found, then execution continues at step 816 to evaluate whether the specific contact address meets any of the criteria expressed by the records. An example might be to find if an E.164 number "3129756483" provided as a contact falls within the range of "3129750000–3129759999" specified in criteria field 627 of a record 622 within screening table 620.

If the contact does not satisfy any of the criteria set forth in criteria records, then decision step 816 causes execution to resume with step 820 to cause default screening behavior as described earlier.

On the other hand, if, in step 816, the contact does meet any of the criteria expressed in the criteria records, then execution proceeds with step 818 to determine the sense in which the criteria is to be applied. For example, by referring to the ALLOW field 625 of a record 622, it is determined whether the criteria being met signifies that the contact is permissible or is not.

In one sense, perhaps if the ALLOW field contains a '0', the fact that the contact meets the criteria expressed in the record may mean that the contact is permissible, whereas the lack of any matching records might signify that the contact is impermissible. The criteria record would, in effect, specify the only contacts allowed and exclude all others. In the opposite sense, if the ALLOW field contains a '1', the contact having met the criteria may mean that the contact is to be disqualified.

In one embodiment, the criteria of screening records may be configured in observance of a policy that none of the criteria ranges should overlap. This approach is advantageous in that a given contact may only satisfy, at most, one criteria record. Once that record has been located, none of the remaining records need to be evaluated with respect to the contact. Another advantage with ensuring that only a single criteria record applies to a given contact is that the screening sense of the record, as indicated by ALLOW field 625, suffices to unambiguously convey the disposition of the contact. Otherwise, without some additional logic, having overlapping criteria with differing ALLOW field values creates the possibility of conflicting screening determinations.

Those of ordinary skill in the art will appreciate that there may be alternative ways to process criteria records even if criteria are allowed to overlap, such as establishing some precedence for considering the net effect of all of the criteria that the contact satisfies.

Figure 9:
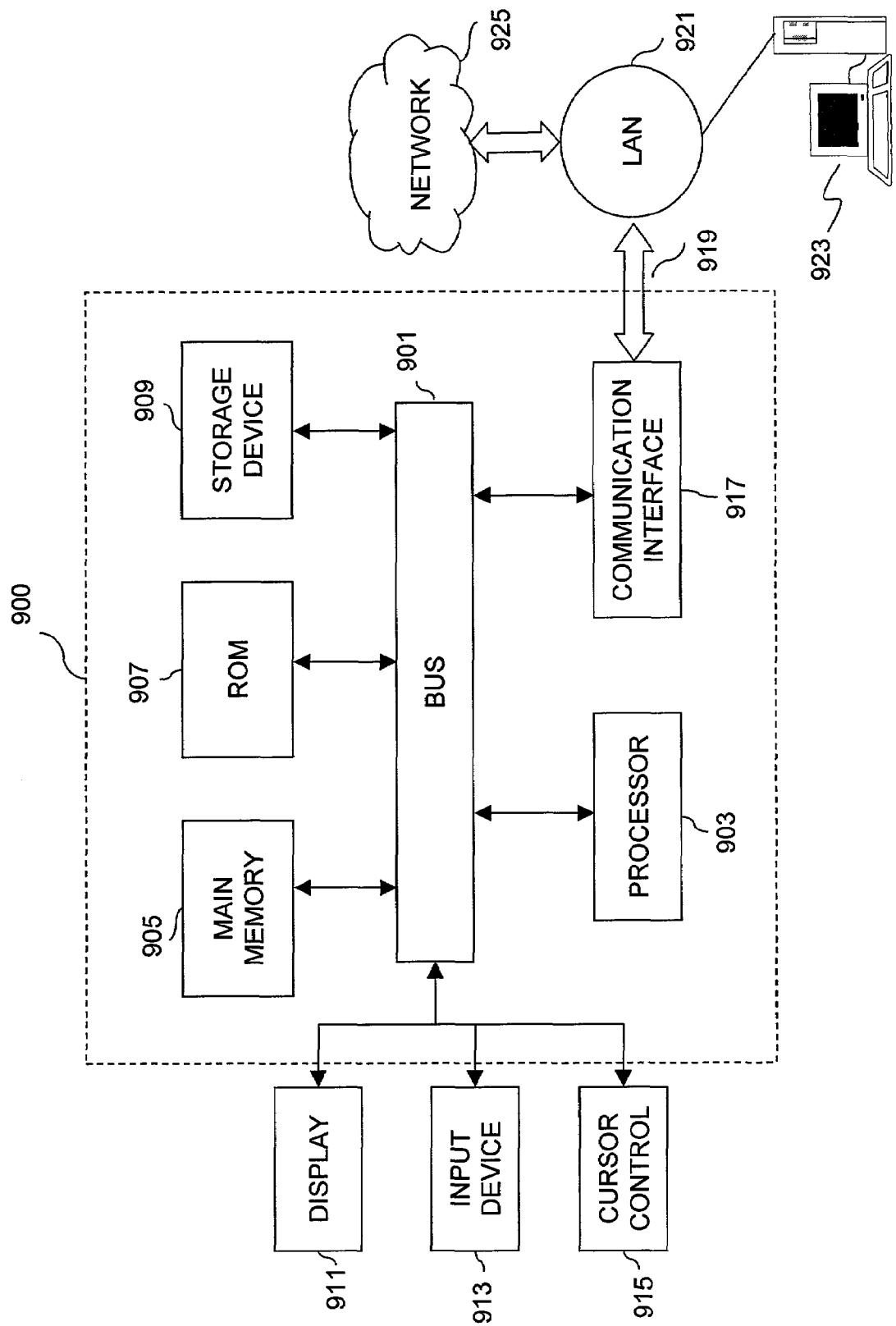
FIG. 9 is a diagram of a computer system that may be used to implement an embodiment of the present invention.

FIG. 9 illustrates a computer system 900 within which an embodiment according to the present invention can be implemented. The computer system 900 includes a bus 901 or other communication mechanism for communicating information among system components, and a processor 903 coupled to the bus 901 for processing information. The computer system 900 also includes main memory 905, such as a random access memory (RAM) or other dynamic storage device, coupled to the bus 901 for storing information and instructions to be executed by the processor 903. Main memory 905 can also be used for storing temporary variables or other intermediate information during execution of instructions to be executed by the processor 903. The computer system 900 further includes a read only memory (ROM) 907 or other static storage device coupled to the bus 901 for storing static information and instructions for the processor 903. A storage device 909, such as a magnetic disk or optical disk, is additionally coupled to the bus 901 for storing information and instructions.

The computer system 900 may be coupled via the bus 901 to a display 911, such as a cathode ray tube (CRT), liquid crystal display, active matrix display, or plasma display, for displaying information to a computer user. An input device 913, such as a keyboard including alphanumeric and other keys, is coupled to the bus 901 for communicating information and command selections to the processor 903. Another type of user input device is cursor control 915, such as a mouse, a trackball, or cursor direction keys for communicating direction information and command selections to the processor 903 and for controlling cursor movement on the display 911.

According to one embodiment of the invention, the SIP server functionalities are provided by the computer system 900 in response to the processor 903 executing an arrangement of instructions contained in main memory 905. Such instructions can be read into main memory 905 from another computer-readable medium, such as the storage device 909. Execution of the arrangement of instructions contained in main memory 905 causes the processor 903 to perform the process steps described herein. One or more processors in a multi-processing arrangement may also be employed to execute the instructions contained in main memory 905. In alternative embodiments, hard-wired circuitry may be used in place of or in combination with software instructions to implement the embodiment of the present invention. Thus, embodiments of the present invention are not limited to any specific combination of hardware circuitry and software.

The computer system 900 also includes a communication interface 917 coupled to bus 901. The communication interface 917 provides a two-way data communication coupling to a network link 919 connected to a local network 921. For example, the communication interface 917 may be a digital subscriber line (DSL) card or modem, an integrated services digital network (ISDN) card, a cable modem, or a telephone modem to provide a data communication connection to a corresponding type of telephone line. As another example, communication interface 917 may be a local area network (LAN) card (e.g. for Ethernet™ or an Asynchronous Transfer Model (ATM) network) to provide a data communication connection to a compatible LAN. Wireless links can also be implemented. In any such implementation, communication interface 917 sends and receives electrical, electromagnetic, or optical signals that carry digital data streams representing various types of information. Further, the communication interface 917 can include peripheral interface devices, such as a Universal Serial Bus (USB) interface, a PCMCIA (Personal Computer Memory Card International Association) interface, etc. Although only a single communication interface 917 is shown, it is recognized that multiple communication interfaces may be employed to communicate with different networks and devices.

The network link 919 typically provides data communication through one or more networks to other data devices. For example, the network link 919 may provide a connection through local network 921 to a host computer 923, which has connectivity to a network 925 (e.g. a wide area network (WAN) or the global packet data communication network now commonly referred to as the "Internet") or to data equipment operated by service provider. The local network 921 and network 925 both use electrical, electromagnetic, or optical signals to convey information and instructions. The signals through the various networks and the signals on network link 919 and through communication interface 917, which communicate digital data with computer system 900, are exemplary forms of carrier waves bearing the information and instructions.

The computer system 900 can send messages and receive data, including program code, through the networks, network link 919, and communication interface 917. In the Internet example, a server (not shown) might transmit requested code belonging am application program for implementing an embodiment of the present invention through the network 925, local network 921 and communication interface 917. The processor 904 may execute the transmitted code while being received and/or store the code in storage device 909, or other non-volatile storage for later execution. In this manner, computer system 900 may obtain application code in the form of a carrier wave.

The term "computer-readable medium" as used herein refers to any medium that participates in providing instructions to the processor 904 for execution. Such a medium may take many forms, including but not limited to non-volatile media, volatile media, and transmission media. Non-volatile media include, for example, optical ol magnetic disks, such as storage device 909. Volatile media include dynamic memory, such as main memory 905. Transmission media include coaxial cables, copper wire and fiber optics, including the wires that comprise bus 901. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the present invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistance (PDA) and a laptop. An infrared detector on the portable computing device receives the information and instructions borne by the infrared signal and places the data on a bus. The bus conveys the data to main memory, from which a processor retrieves and executes the instructions. The instructions received by main memory may optionally be stored on storage device either before or after execution by processor.

While the present invention has been described in connection with a number of embodiments and implementations, the present invention is not so limited but covers various obvious modifications and equivalent arrangements, which fall within the purview of the appended claims.

What is claimed is:

1. In a communications system, a method for establishing a communications session with a party comprising:
  invoking at least one feature in the communications system that results in at least one contact for establishing the communications session with the party;
  determining a type of address associated with the contact;
  applying at least one screening criterion to the contact, based on the determined type of address, to determine whether the contact is permitted to he used for establishing communications with the party; and
  using the contact to establish communications with the party, when the contact is permitted to establish communications with the party.

2. The method of claim 1 further comprising:
  storing a user profile associated with the party, wherein the invoking of the feature is affected by the content of the user profile.

3. The method of claim 1 further comprising:
  storing a user profile associated with the party, wherein the screening criterion is affected by the content of the user profile.

4. The method of claim 1 wherein the invoking of the feature is affected by contents of at least one data structure maintained in the system and associated with the party.

5. The method of claim 1 wherein the screening criteria is affected by contents of a data structure maintained in the system and associated with the party.

6. The method of claim 1 wherein the applying at least one screening criterion to the contact is conditionally performed as a function of whether the contact results from the invoking of the feature.

7. In a communications system, a method for processing a request to establish a communications session with a party comprising:
  receiving a session request to establish a communications session with the party, wherein the session request is received from a requestor;
  obtaining at least one contact by applying at least one routing feature in response to the session request, the contact pertaining to establishing the communications session with the party;
  determining a type of address of the contact;
  accessing user profile information associated with the party;
  obtaining at least one screening criterion from the user profile information, wherein the at least one screening criterion is based on the determined type of address of the contact;
  applying the screening criterion to the contact to determine whether the contact is permitted to be contained in a response to the session request;
  including the contact in the response to the session request, when the contact is permitted to be contained in the response to the session request; and
  sending the response to the session request to the requestor.

8. The method of claim 7, wherein operation of the routing feature is affected by the user profile information.

9. A location server, coupled to a communications system, to establish a communications session between a requesting party and a destination party, the location server comprising:
  means for receiving a routing request;
  means for invoking a feature to determine at least one contact for establishing the communications session between the requesting and destination parties;
  means for determining a type of address of the at least one contact;
  means for applying at least one screening criterion to the at least one contact based on the determined type of address of the at least one contact, to determine whether the contact is permitted to be used for establishing the communications session; and
  means for sending a routing response, the routing response including the contact if the contact is permitted to be used for establishing the communications session.

10. The location server of claim 9, wherein the communications system further comprises:
  a proxy server, wherein the routing request is received from the proxy server.

11. The location server of claim 9, wherein the communications system further comprises:
  a proxy server, wherein the routing response is sent to the proxy server.

12. The location server of claim 9, wherein the routing request includes information relating to the identification of the requesting and destination parties.

13. The location server of claim 9, further comprising:
  means for obtaining a user profile, wherein said user profile affects the at least one screening criterion.

14. The location server of claim 9, wherein the feature comprises at least one of: find me, call forwarding, conditional call forwarding, call blocking, do not disturb or call screening.

15. The location server of claim 9, further comprising:
  means for obtaining at least one screening table, wherein said screening table comprises screening criteria records comprising the at least one screening criterion.

16. The method of claim 1, further comprising:
  obtaining the at least one screening criterion from a first screening table if the determined type of address corresponds to a telephone number or from a second screening table if the determined type of address corresponds to an IP address.

* * * * *